(12) United States Patent
Maruko et al.

(10) Patent No.: US 10,989,607 B2
(45) Date of Patent: Apr. 27, 2021

(54) THERMOCOUPLE

(71) Applicant: FURUYA METAL CO., LTD., Tokyo (JP)

(72) Inventors: Tomohiro Maruko, Tokyo (JP); Tomoaki Miyazawa, Tokyo (JP); Shoji Saito, Tokyo (JP); Yuya Okawa, Tokyo (JP); Kensuke Morita, Tokyo (JP); Yoshiteru Arai, Tokyo (JP)

(73) Assignee: FURUYA METAL CO., LTD., Tokyo (JP)

( * ) Notice: Subject to any disclaimer, the term of this patent is extended or adjusted under 35 U.S.C. 154(b) by 235 days.

(21) Appl. No.: 16/319,856

(22) PCT Filed: Nov. 4, 2016

(86) PCT No.: PCT/JP2016/082781
§ 371 (c)(1),
(2) Date: Jan. 23, 2019

(87) PCT Pub. No.: WO2018/020696
PCT Pub. Date: Feb. 1, 2018

(65) Prior Publication Data
US 2019/0271600 A1 Sep. 5, 2019

(30) Foreign Application Priority Data

Jul. 29, 2016 (JP) .............................. JP2016-149754
Oct. 20, 2016 (JP) .............................. JP2016-206128

(51) Int. Cl.
*G01K 7/02* (2021.01)
*G01K 1/00* (2006.01)
(Continued)

(52) U.S. Cl.
CPC ................. *G01K 7/02* (2013.01); *G01K 1/08* (2013.01); *G01K 13/02* (2013.01)

(58) Field of Classification Search
USPC ......................................... 374/179, 208, 163
See application file for complete search history.

(56) References Cited

U.S. PATENT DOCUMENTS

| 3,376,170 A | 4/1968 | Logan et al. |
| 4,861,169 A | 8/1989 | Yoshimura |

(Continued)

FOREIGN PATENT DOCUMENTS

| CN | 104931148 | 9/2015 |
| JP | 44-2758 | 2/1969 |

(Continued)

OTHER PUBLICATIONS

International Search Report dated Jan. 31, 2017 in corresponding PCT International Patent Application PCT/JP2016/082781, 1 page.

(Continued)

*Primary Examiner* — Mirellys Jagan
(74) *Attorney, Agent, or Firm* — Ohlandt, Greeley, Ruggiero & Perle, L.L.P.

(57) ABSTRACT

A thermocouple capable of preventing a decrease in strength of a temperature measuring junction portion while maintaining temperature responsiveness and productivity in comparison with a conventional thermocouple. A thermocouple including two wires and a clamping member, the clamping member clamping the two wires while distal end portions of the wires being in contact with each other in parallel to provide a temperature measuring junction portion, in which when it is assumed that diameters of the two wires are d1 and d2 (where d1≥d2) respectively; a length of the temperature measuring junction portion in a longitudinal direction of the two wires is L; a maximum width of the temperature measuring junction portion in a parallel direction of the two wires is D; and a maximum width in a direction orthogonal to the parallel direction in a cross section of the temperature measuring junction portion is E, the following equations are satisfied:

(Continued)

$$0.5 \times (d1+d2) \leq L \leq 5 \times (d1+d2) \quad \text{Equation (1)}$$

$$1 \times (d1+d2) < D \leq 5 \times (d1+d2) \quad \text{Equation (2)}$$

$$1.4 \times d1 < E \leq 8 \times d1. \quad \text{Equation (3)}$$

11 Claims, 4 Drawing Sheets

(51) Int. Cl.
  *G01K 1/08* (2021.01)
  *G01K 13/02* (2021.01)

(56) References Cited

U.S. PATENT DOCUMENTS

| | | | |
|---|---|---|---|
| 6,143,324 | A | 11/2000 | Michaud et al. |
| 7,753,584 | B2 * | 7/2010 | Gambino ............ H01L 35/20 |
| | | | 374/179 |
| 2008/0205483 | A1 * | 8/2008 | Rempe ............ H01L 35/34 |
| | | | 374/179 |
| 2013/0250999 | A1 * | 9/2013 | Honeck ............ G01K 7/026 |
| | | | 374/179 |
| 2014/0328374 | A1 | 11/2014 | Yamasaki et al. |
| 2017/0101700 | A1 | 4/2017 | Maruko et al. |

FOREIGN PATENT DOCUMENTS

| | | |
|---|---|---|
| JP | 1-288742 | 11/1989 |
| JP | 3-35135 | 2/1991 |
| JP | 11-269202 | 10/1999 |
| JP | 2007-271456 | 10/2007 |
| JP | 2011-158424 | 8/2011 |
| JP | 2013-104705 | 5/2013 |
| JP | 2015-200014 | 11/2015 |

OTHER PUBLICATIONS

International Preliminary Report on Patentability dated Jan. 29, 2019 in corresponding PCT International Patent Application PCT/JP2016/082781, 13 pages.
Korean Office Action dated Jun. 19, 2019 in corresponding Korean Patent Application No. 10-2019-7001069, 7 pages.
Chinese Office Action dated Jan. 13, 2020 in corresponding Chinese Patent Application No. 201680087694.4, 13 pages.

\* cited by examiner

THERMOCOUPLE

BACKGROUND

1. Field of the Disclosure

The present disclosure relates to a thermocouple.

2. Discussion of the Background Art

In the semiconductor manufacturing field, temperature control of the process is essential, and a high-precision thermocouple such as R thermocouple or S thermocouple is used. In the process, there is also a temperature range where commonly used temperature exceeds 1100° C. In such a temperature range, a so-called bamboo structure is formed in which crystal grains of a wire cross a wire diameter, and an event occurs in which the thermocouple is easily broken. In order to suppress the disconnection, a thermocouple using a wire in which texture is controlled (for example, see Patent Literature 1) or a thermocouple using an oxide-dispersion-strengthened wire (for example, Patent Literature 2) has been developed to achieve a long life of the thermocouple.

A thermocouple fixture is disclosed which includes a heat conducting part which is inserted into a through-hole provided in an object of temperature measurement, a holding part for the thermocouple provided in the heat conducting part, and a plurality of elastically deformable leg parts formed continuously from the heat conducting part, in which the leg parts are inserted into the through-hole to allow the heat conducting part to be supported by the through-hole by their elastic force, thereby fixing the thermocouple to the object of temperature measurement (for example, see Patent Literature 3).

There is disclosed a method of measuring a surface temperature of a moving casting piece formed by being embedded and fixing, in a surface of a casting piece, an embedding metal piece inside which a tip hot junction portion of a sheathed thermocouple is positioned (for example, see Patent Literature 4).

A mounting structure of a thermocouple is disclosed in which a reinforcing member for fixing a wire of bonded thermocouple is provided on an upper part or a periphery of a measuring object portion (for example, see Patent Literature 5).

CITATION LIST

Patent Literatures

Patent Literature 1: JP 2015-200014 A
Patent Literature 2: JP 2013-104705 A
Patent Literature 3: JP 2007-271456 A
Patent Literature 4: JP 3-35135 A
Patent Literature 5: JP 2011-158424 A

SUMMARY

Even if a thermocouple is formed by using wires with improved life as in Patent Literatures 1 and 2, a bonding point, a so-called temperature measuring junction between a plus leg and a minus leg is formed by melting welding. Therefore, the following problems 1 to 3 occur. At a fusing point, there is no effect of strengthening by texture control or oxide dispersion strengthening, and a frequency of breakage in the vicinity of the temperature measuring junction cannot be reduced (Problem 1. Disappearance of strengthening mechanism of a wire at the junction). Resistance welding among melting weldings, under a suitable condition, only partially melts contact portions of two wires, so that strengthening mechanism does not completely disappear. In addition, the time required for welding is short and productivity is high. However, it is difficult to maintain the strengthening mechanism perfectly because an interface between an original reinforced texture and the texture melted by the resistance welding is a path of breakage (Problem 2. Difficult to maintain the strengthening mechanism of the wire at the junction). In addition, since the time required for welding is also short and instantaneous, it is difficult to control the amount of deformation at the time of welding, and if the deformation is too large, a cross-sectional area of the wire decreases and risk of disconnection increases (Problem 3. Risk of disconnection due to the decreased cross-sectional area increases).

Diffusion bonding may be mentioned as a bonding method without melting. According to this method, two wires are bonded by using heat and pressure, and there is no melting portion. Therefore, the problems 1 and 2 are solved. However, since it is necessary to apply sufficient heat and pressure in order to firmly bond the wires, the wires are deformed and cross-sectional areas of the wires are reduced. As a result, the risk of disconnection increases, the problem 3 cannot be solved. On the other hand, it is possible to maintain the strengthening mechanism if the diffusion bonding is achieved only by heat without applying pressure for fear of deformation of the wire. However, it takes a very long time for the bonding, resulting in a problem of low productivity (Problem 4. Poor productivity).

Further, a method of mechanically fastening is also conceivable. However, since the thermocouple is exposed to a cold and a hot environment, the thermocouple expands and contracts repeatedly. As a result, the problem arises that a fastening part loosens and it is impossible to perform stable temperature measurement (Problem 5. Looseness of junction during use).

In Patent Literatures 3 to 5, a bonding location of thermocouple wires and the periphery thereof are just covered with a fixing tool, a metal piece, a reinforcing material, or the like, which is not sufficient to improve a problem of disconnection at the bonding location of the thermocouple wires and the periphery thereof. Further, if a range for reinforcing the thermocouple is wide or a reinforcing member for reinforcing the thermocouple is thick, a responsiveness is poor (Problem 6. Responsiveness). Furthermore, when a protective tube or the like is used in manufacturing, it is difficult to accommodate wires in the protective tube (Problem 7. Difficulty in manufacturing). Thus, means for solving all the problems 1 to 7 is not known.

The present disclosure aims to provide a thermocouple capable of solving all the problems 1 to 7, that is, a thermocouple capable of preventing a decrease in strength of a temperature measuring junction portion while maintaining temperature responsiveness and productivity as compared with a conventional thermocouple.

Solution to Problem

A thermocouple according to the present disclosure includes two wires and a clamping member, the clamping member clamping the two wires while distal end portions of the wires being in contact with each other in parallel to provide a temperature measuring junction portion, wherein, when it is assumed that diameters of the two wires are d1 and d2 (where d1≥d2) respectively, a length of the temperature measuring junction portion in a longitudinal direction of the two wires is L, a maximum width of the temperature measuring junction portion in a parallel direction of the two wires is D, and a maximum width in a direction orthogonal to the parallel direction in a cross section of the temperature measuring junction portion is E, the following equations (1) to (3) are satisfied:

$$0.5 \times (d1+d2) \leq L \leq 5 \times (d1+d2) \quad \text{Equation (1)}$$

$$1 \times (d1+d2) < D \leq 5 \times (d1+d2) \quad \text{Equation (2)}$$

$$1.4 \times d1 < E \leq 8 \times d1. \quad \text{Equation (3)}$$

In the thermocouple according to the present disclosure, it is preferable that at least one of the two wires has a texture such that an aspect ratio of a length of crystal grains of a texture in the longitudinal direction of the wires and a length of the crystal grains of the texture in a radial direction of the wires is 5 or more. The bamboo structure is hardly formed, and the wire is less likely to be broken.

In the thermocouple according to the present disclosure, it is preferable that at least one of the two wires has the texture such that the number of the crystal grains in the radial direction of the wires is 2 or more. The bamboo structure is hardly formed, and the wire is less likely to be broken.

In the thermocouple according to the present disclosure, it is preferable that at least one location between at least one of the two wires and the clamping member is diffusion-bonded. Since, due to the use of a thermocouple, the wire and the clamping member proceed in diffusion and are bonded to each other while being exposed to a high temperature, the productivity is not lowered.

Advantageous Effects of Disclosure

According to the present disclosure, it is possible to provide a thermocouple capable of preventing a decrease in strength of the temperature measuring junction portion while maintaining temperature responsiveness and productivity as compared with a conventional thermocouple.

DETAILED DESCRIPTION OF THE PREFERRED EMBODIMENT

Next, the present disclosure will be described in detail with reference to embodiments, but the present disclosure is not construed as being limited to the descriptions. Various modifications may be made to the embodiments as long as effects of the present disclosure are exerted.

Figure 1:
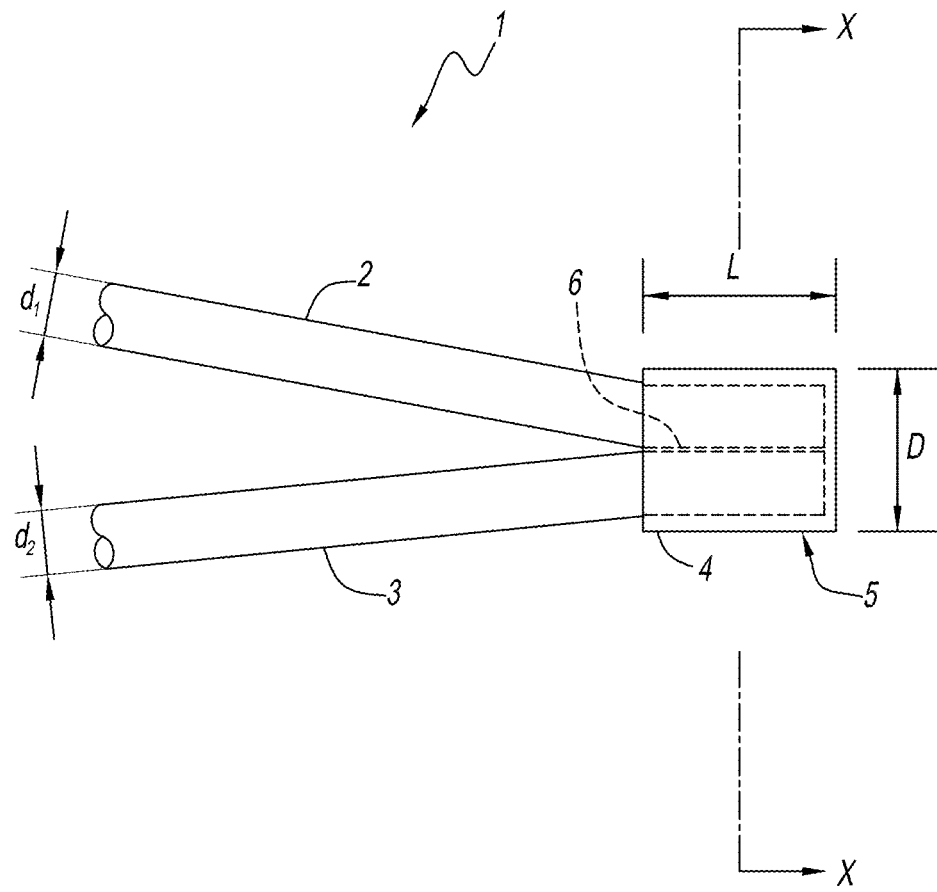
FIG. 1 is a schematic diagram illustrating an example of a thermocouple according to the present embodiment.
Figure 2:
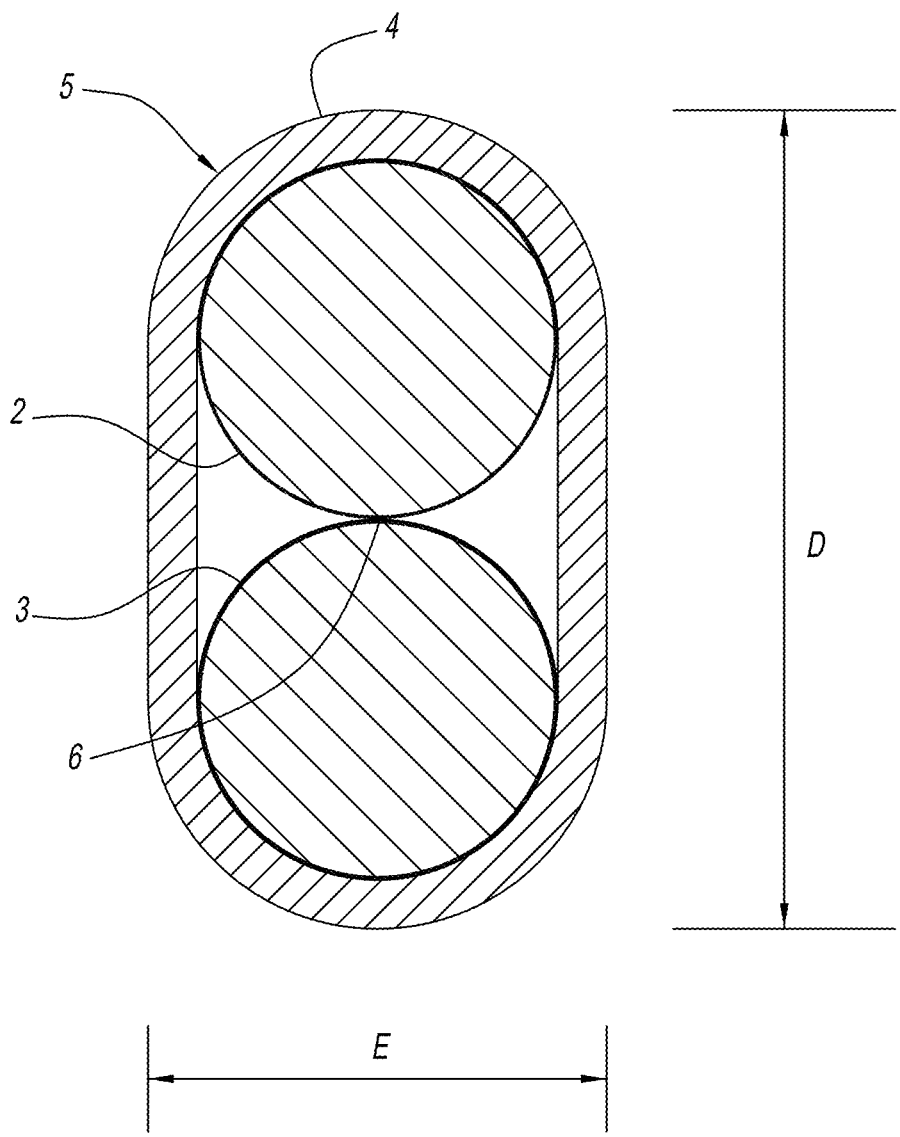
FIG. 2 is a cross-sectional view taken along a line X-X in FIG. 1.

As illustrated in FIG. 1 or 2, a thermocouple 1 according to the present embodiment is a thermocouple which has two wires 2 and 3 and a clamping member 4, the clamping member 4 clamping the two wires 2 and 3 while distal end portions of the wires being in contact with each other in parallel to provide a temperature measuring junction portion 5, in which, when it is assumed that diameters of the two wires 2 and 3 are d1 and d2 (where d1≥d2) respectively, and a length of the temperature measuring junction portion 5 in a longitudinal direction of the two wires 2 and 3 is L, a maximum width of the temperature measuring junction portion 5 in a parallel direction of the two wires 2 and 3 is D, and a maximum width of a cross section of the temperature measuring junction portion 5 in a direction orthogonal to the parallel direction is E, the following equations (1) to (3) are satisfied:

$$0.5 \times (d1+d2) \leq L \leq 5 \times (d1+d2) \quad \text{Equation (1)}$$

$$1 \times (d1+d2) < D \leq 5 \times (d1+d2) \quad \text{Equation (2)}$$

$$1.4 \times d1 < E \leq 8 \times d1. \quad \text{Equation (3)}$$

The thermocouple 1 is preferably a temperature sensor suitable for temperature measurement in a high temperature range exceeding 1100° C. The thermocouple 1 may include an insulation tube (not illustrated) into which the wires 2 and 3 are inserted, and a protective tube (not illustrated) that accommodates the insulation tube (not illustrated).

The wires 2 and 3 are metal wires. The respective diameters d1 and d2 of the wires 2 and 3 are not particularly limited, but they are preferably from 0.2 to 2 mm, more preferably from 0.3 to 0.75 mm. The diameters d1 and d2 of the wires 2 and 3 are circle equivalent diameters calculated from cross-sectional areas of portions of the wires 2 and 3 which are not clamped by the clamping member 4. Values of the diameters d1 and d2 of the respective wires 2 and 3 may be the same as or different from each other. When the values are different from each other, d1 is the diameter which is relatively large, and d2 is the diameter which is relatively small.

Material of the wires 2 and 3 is preferably one or more elements selected from Platinum Group Metal (PGM), for example, Ru, Rh, Pd, Os, Ir or Pt, W and Re. In addition, the wires 2 and 3 may be strengthened by texture control, oxide dispersion or the like.

Combinations of the wires 2 and 3 are, for example, a combination of Pt and Pt—Rh alloy such as an R thermocouple or an S thermocouple; a combination of W and W—Re alloy; a combination of W—Re alloy and W—Re alloy; or a combination of Pt—Pd—Au alloy and Pd—Au alloy such as platinel. In the present disclosure, the material can be selected according to the temperature to be measured, and is not limited to the material of the wires 2 and 3.

In the thermocouple 1 according to the present embodiment, at least one of the two wires 2 and 3 has preferably a texture such that an aspect ratio of a length of crystal grains of a texture in the longitudinal direction of the wires 2 and 3 and a length of the crystal grains of the texture in a radial direction of the wires 2 and 3 is 5 or more. The bamboo structure is hardly formed, and the wires 2 and 3 are less likely to be broken. The aspect ratio is more preferably 10 or more. The larger the aspect ratio is, the more preferable it is. An upper limit of the aspect ratio is not particularly limited, but is, for example, 1000 or less. For example, the aspect ratio may be obtained as follows. That is, the aspect ratio may be obtained by randomly selecting five or more crystal grains appearing in a cross section parallel to a wire length direction passing near a center of a wire diameter and obtaining an average of (a length of the crystal grains in an axial direction)/(the length of the crystal grains of the texture in the radial direction orthogonal to the longitudinal direction) of the crystal grains.

In the thermocouple 1 according to the present embodiment, at least one of the two wires 2 and 3 has preferably the texture such that the number of the crystal grains in the radial direction of the wires 2 and 3 is 2 or more. The bamboo structure is hardly formed, and the wires are less likely to be broken. It is more preferable that the number of crystal grains in the radial direction of the wires 2 and 3 is 3 or more. The larger the number of the crystal grains in the radial direction of the wires 2 and 3 is, the more preferable it is. An upper limit of the number of the crystal grains in the radial direction of the wires 2 and 3 is not particularly limited, but is, for example, 100 or less. The number of the crystal grains in the radial direction of the wires 2 and 3 is obtained, for example, as follows. That is, the number may be obtained by counting the crystal grains arranged in a radial direction in a cross section parallel to a wire length direction passing near the center of the wire diameter.

The clamping member 4 is a member that clamps the wires 2 and 3 while distal end portions of the wires being in contact with each other such that the temperature measuring junction portion 5 is provided. The clamping member 4 is, for example, a tubular member or a member obtained by rolling a plate-like member into a tubular shape.

The clamping member 4 is preferably made of a conductive material. It is more preferable that the material of the clamping member 4 is the same as the material of either of the wires 2 and 3. Generation of thermoelectromotive force due to contact of dissimilar materials can be suppressed.

The material of the clamping member 4 is preferably selected according to the material of the wires 2 and 3. When the wires 2 and 3 have mutually-common principal components, it is preferable that the material of the clamping member 4 is made of the same material as the principal components of the wires 2 and 3. When the wires 2 and 3 do not have mutually-common principal components, if the component common to the principal component of either one of the wires 2 and 3 is in the other wire, the material of the clamping member 4 is preferably is set such that the component common to the principal component of either one of the wires 2 and 3 clamps the wires. Further, when the component common to the wires 2 and 3 is not the principal component of the wires 2 and 3 and when there is no component common to the wires 2 and 3, the material of the clamping member 4 is preferably set to be the same as the principal component of either one of the wires 2 and 3. Here, the principal component refers to a component having the largest atomic composition ratio (at. %, atomic %), among the components constituting the wires 2 and 3. Several examples are given regarding a preferable relationship between the material of the clamping member 4 and the material of the wires 2 and 3, but these examples do not limit the present disclosure. When the wires 2 and 3 are a combination of Pt and Pt—Rh alloy such as the R thermocouple or the S thermocouple, both the principal components of the wires 2 and 3 are Pt. At this time, the material of the clamping member 4 is preferably Pt. When the wires 2 and 3 are a combination of W and W—Re alloy or a combination of W—Re alloy and W—Re alloy, both the principal components of the wires 2 and 3 are W. At this time, the material of the clamping member 4 is preferably W. When the wires 2 and 3 are a combination of Pt—Pd—Au alloy and Pd—Au alloy such as platinel, the component common to the wires 2 and 3 is Pd. At this time, the material of the clamping member 4 is preferably Pd.

The temperature measuring junction portion 5 includes a portion where the wires 2 and 3 are clamped by the clamping member 4 and the clamping member 4. The temperature measuring junction portion 5 has a contact portion 6 of the wires 2 and 3 therein. A portion of the contact portion 6 closest to a measurement device (not illustrated) is substantially the temperature measuring junction. In the contact portion 6, it is sufficient that the wires 2 and 3 are in contact with each other, and it is preferable not to have a melting portion. The breakage caused by the melting portion is suppressed, and the temperature measuring junction portion 5 having improved strength compared to the thermocouple having the temperature measuring junction formed by the conventional welding is obtained. However, as long as strength does not deteriorate, the contact portion 6 may have a melting portion.

In the thermocouple 1 according to the present embodiment, it is preferable that at least one location between at least one of the two wires 2 and 3 and the clamping member 4 is diffusion-bonded. Preferably, no special process is provided for the purpose of the diffusion bonding, but the diffusion bonding is formed by progress of diffusion while the two wires 2 and 3 and the clamping member 4 are being exposed to high temperature during use of the thermocouple 1. In this way, since the wires 2 and 3 and the clamping member 4 are firmly bonded to each other during use of the thermocouple 1, the two wires 2 and 3 and the clamping member 4 may not be bonded immediately after the thermocouple 1 is assembled. It is possible to manufacture the thermocouple 1 without lowering the productivity. Further, the diffusion bonding may be provided by specially providing a process for the purpose of diffusion bonding and partially diffusing the two wires 2 and 3 and the clamping member 4 or by diffusing and bonding the two wires 2 and 3 and then partially diffusing and bonding the two wires and the clamping member 4.

An example of a method for manufacturing the thermocouple 1 will be described. First, the wires 2 and 3 are placed in a cylinder of the clamping member 4 while the distal end portions of the wires 2 and 3 being in parallel. At this time, the distal end portions of the wires 2 and 3 may be arranged over the entire area of the clamping member 4 or may be arranged in a partial area of the clamping member 4. The distal end portions of the wires 2 and 3 may protrude from the clamping member 4. In addition, the wires 2 and 3 may be in parallel with their tips directed in the same direction or may be in parallel with their tips directed in opposite directions. Then, the temperature measuring junction portion 5 is formed by crushing the clamping member 4 in the vertical direction (the direction orthogonal to the parallel direction of the wires 2 and 3) and then crushing the member in the horizontal direction (the direction along the parallel direction of the wires 2 and 3). An order in which the clamping member 4 is crushed is not particularly limited, and the member may be crushed in the vertical direction after being crushing in the horizontal direction. Further, the crushing may be performed a plurality of times.

In the method of manufacturing a thermocouple according to the present embodiment, it is preferable not to have a step of forming a temperature measuring junction for intentionally bonding the wires 2 and 3 by welding or diffusion bonding or the like. For example, in a resistance welding where the wires 2 and 3 are partially melted or in a diffusion bonding where a pressure accompanied by deformation is applied, there is a problem that cross-sectional areas of the wires 2 and 3 decrease due to the deformation of the wires, but in the thermocouple according to the present embodiment, deformation of the wires 2 and 3 can be prevented by using the clamping member 4 and a sufficient strength of the temperature measuring junction portion 5 can be maintained.

As a size of the clamping member 4 is increased, the strength of the temperature measuring junction portion 5 tends to be improved. However, there is no need to improve the strength of the temperature measuring junction portion 5 to reach a strength exceeding the strength of the wires 2 and 3. Further, if the clamping member 4 is too large, it may be difficult to incorporate the member into a device or equipment. For example, normally, in the thermocouple, the two wires are inserted through an insulation tube made of ceramics so as not to contact each other. Further, since a measurement accuracy will decrease if the wires are contaminated from the outside, a protective tube may be used to prevent the contamination. For example, in the case of using a wire having a diameter of ϕ0.5 mm, an elliptical tube having a long diameter of 2 mm and a short diameter of 1.5 mm or a circular tube of about ϕ2 mm or 0 mm is often used as the insulation tube. In this case, a circular tube having an inner diameter of ϕ4 to ϕ12 mm is used as the protective tube. As described above, when the protective tube is used, it is impossible to make the temperature measuring junction portion 5 larger than the inner diameter of the protective tube. It is preferable that the temperature measuring junction portion 5 is smaller than an outer diameter of the insulation tube, because there is less fear of crashing the temperature measuring junction portion 5 against the inner wall of the protective tube at the time of assembly. Here, when the insulation tube is a two-hole tube, the outer diameter of the insulation tube is an outer dimension of the two-hole tube, and when the insulation tube is constituted by two tubes through which the wires 2 and 3 are inserted respectively, the outer diameter of the insulation tube is a sum of outer dimensions of the two tubes. Further, although it seems to be to prevent contact with the outside of the temperature measuring junction portion 5, a user of the thermocouple may require a thermocouple formed in a shape where the temperature measuring junction portion 5 is accommodated in a groove and the like processed on the insulation tube in the vicinity of the temperature measuring junction portion 5. In addition, the temperature measuring junction portion 5, which is larger than necessary, lowers responsiveness. When temperature responsiveness are poor, there is a difference from the temperature measuring junction portion 5 by general welding when measuring a rapid increasing/decreasing temperature or when performing a heat treatment and the like including a temperature increase/decrease time. For this reason, it is convenient to use the temperature measuring junction portion 5 of the thermocouple which is smaller than the outer diameter of the insulation tube or the inner diameter of the protective tube even when it is used and even when it is manufactured.

Therefore, as a result of intensive research, the present inventors have found that the temperature measuring junction portion 5 is not excessively larger than necessary and sufficient strength can be obtained by setting a size of the temperature measuring junction portion 5 in the thermocouple 1 so as to satisfy requirements of the equations (1) to (3).

L is the length in the longitudinal direction of the two wires 2 and 3 of the temperature measuring junction portion 5 and is equal to or more than $0.5\times(d1+d2)$ and equal to or less than $5\times(d1+d2)$ as in the equation (1). When L is less than $0.5\times(d1+d2)$, manufacturing may be difficult. When L is more than $5\times(d1+d2)$, the temperature responsiveness deteriorate. In addition, it is difficult to incorporate the temperature measuring junction portion 5 into a peripheral member such as the protective tube, the insulation tube or the like. L is preferably $0.5\times(d1+d2)$ or more and $3\times(d1+d2)$ or less, and L is more preferably $0.5\times(d1+d2)$ or more and $1\times(d1+d2)$ or less.

D is a maximum width in the parallel direction of the two wires 2 and 3 of the temperature measuring junction portion 5, and is more than $1\times(d1+d2)$ and is equal to or less than $5\times(d1+d2)$ as in the equation (2). If D is equal to $1\times(d1+d2)$ or less, the strength of the temperature measuring junction portion 5 is insufficient due to the deformation of the wires 2 and 3. When D is more than $5\times(d1+d2)$, the temperature responsiveness deteriorate. In addition, it is difficult to incorporate the temperature measuring junction portion 5 into a peripheral member such as the protective tube or the insulation tube. When temperature responsiveness are required in particular, D is preferably more than $1\times(d1+d2)$ and equal to or less than $3.5\times(d1+d2)$, and it is more preferable that D is more than $1\times(d1+d2)$ and less than $2\times(d1+d2)$.

E is a maximum width in the direction orthogonal to the parallel direction in a cross section of the temperature measuring junction portion 5, and is more than $1.4\times d1$ and equal to or less than $8\times d1$ as in equation (3). If E is equal to or less than $1.4\times d1$, the strength of the temperature measuring junction portion 5 is insufficient due to the deformation of the wires 2 and 3. When E is more than $8\times d1$, the temperature responsiveness deteriorate. In addition, it is difficult to incorporate the temperature measuring junction portion 5 into a peripheral member such as the protective tube or the insulation tube. E is preferably more than $1.4\times d1$ and equal to or less than $5\times d1$ and, more preferably, more than $1.4\times d1$ and equal to or less than $3\times d1$.

EXAMPLES

Hereinafter, the present disclosure will be described in more detail by showing embodiments, but the present disclosure is not interpreted as being limited to the examples.

Experimental Example 1—Temperature Responsiveness Test

Figure 3:
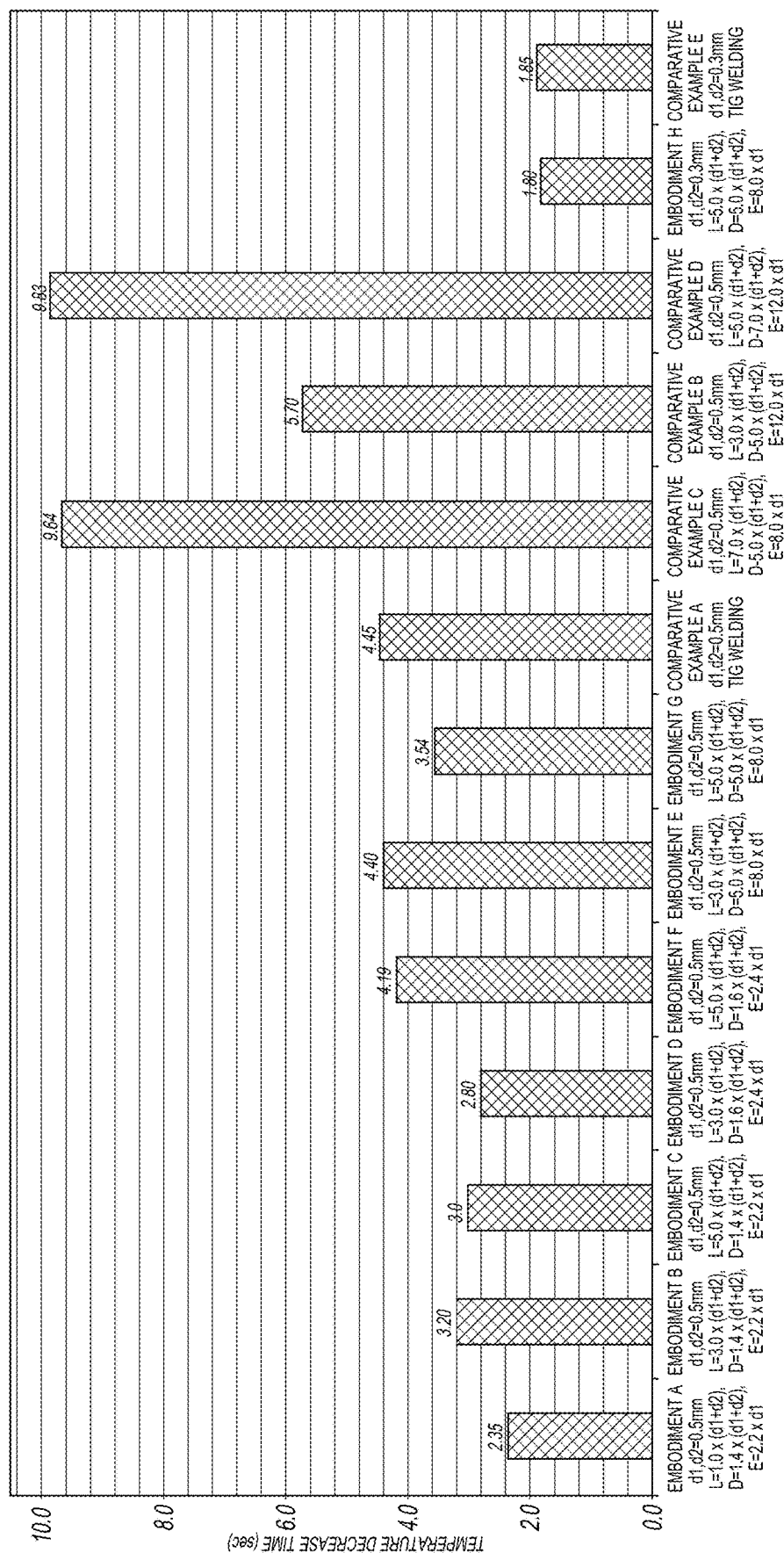
FIG. 3 is a result of a temperature responsiveness test.

Thermocouples (Embodiments A to E, and Comparative Example B) were manufactured as follows. Tips of wires were disposed in parallel in the same direction so as to be brought into contact with each other and clamped by a clamping member to form a temperature measuring junction portion, thus obtaining a thermocouple. At this time, a texture-control-strengthened Pt wire (diameter d1=0.5 mm) was used as one wire and a Pt—Rh alloy wire (diameter d2=0.5 mm) was used as the other wire, and a tubular member made of Pt was used as a clamping member. The texture-control-strengthened Pt wire is a Pt wire with a creep strength increased by controlling the texture so that an aspect ratio of crystal grains is increased. As illustrated in FIG. 1, the two wires were arranged over the entire region of the clamping member in a longitudinal direction of the wire. The d1, d2, L, D and E are as illustrated in FIG. 3.

In the same manner as in Embodiment A, thermocouples (Embodiments F and G, and Comparative Examples C and D) were manufactured. Further, a thermocouple (Embodiment H) was manufactured in the same manner as in Embodiment A, except that a texture-control-strengthened Pt wire (diameter d1=0.3 mm) was used as one wire and a Pt—Rh alloy wire (diameter d2=0.3 mm) was used as the other wire. The d1, d2, L, D and E are as illustrated in FIG. 3.

As a conventional bonding (Comparative Example A), a thermocouple having a temperature measuring junction formed by TIG welding end portions of a Pt wire (diameter d1=0.5 mm) and a Pt—Rh alloy wire (diameter d2=0.5 mm)

was manufactured. The temperature measuring junction had a size in which a length (corresponding to L) of the junction was 1.5 (d1+d2) in the longitudinal direction of the wire, a maximum width (corresponding to D) of the junction was 1.5 (d1+d2) in the parallel direction of the wire, and a maximum width (corresponding to E) of the junction was 3×d1 in a direction orthogonal to the parallel direction.

Conventional bonding (Comparative Example E) was manufactured in the same manner as Comparative Example A except that a Pt wire (diameter d1=0.3 mm) and a Pt—Rh alloy wire (diameter d2=0.3 mm) were used. The temperature measuring junction had a size in which a length (corresponding to L) of the junction was 1.66 (d1+d2) in the longitudinal direction of the wire, a maximum width (corresponding to D) of the junction was 1.66 (d1+d2) in the parallel direction of the wire, and a maximum width (corresponding to E) of the junction was 3.33×d1 in a direction orthogonal to the parallel direction.

The temperature responsiveness test was carried out as follows. A thermocouple was inserted into an electric furnace set at 1000° C. and held until the temperature indicated by the thermocouple was stabilized at 1000° C. The thermocouple stably indicating 1000° C. was withdrawn from the furnace, and the time (hereinafter, also referred to as a temperature decrease time) elapsed until the temperature reached 900° C. was examined. The temperature decrease time is illustrated in FIG. 3.

As illustrated in FIG. 3, since Embodiments A to E satisfied the equations (1) to (3), it was possible to maintain the temperature responsiveness as compared with the conventional bonding (Comparative Example A). Particularly, in Embodiments A to D, the temperature decrease time was shorter than that of the conventional bonding (Comparative Example A) and the temperature responsiveness were better than that of Comparative Example A. Since Comparative Example B did not satisfy the equations (2) and (3), the temperature decrease time was longer than that of the conventional bonding (Comparative Example A), and the temperature responsiveness were inferior to that of Comparative Example A.

As illustrated in FIG. 3, since Embodiments F to H satisfied the equations (1) to (3), it was possible to maintain the temperature responsiveness as compared with the conventional bonding (Comparative Examples A and E). Particularly, in Embodiments F and G, the temperature decrease time was short and the temperature responsiveness were good as compared with the conventional bonding (Comparative Example A). Since Comparative Example C did not satisfy the equation (1), the temperature decrease time was longer than that of the conventional bonding (Comparative Example A), and the temperature responsiveness were inferior to that of Comparative Example A. Since Comparative Example D did not satisfy the equations (2) and (3), the temperature decrease time was longer than that of the conventional bonding (Comparative Example A), and the temperature responsiveness were inferior to that of Comparative Example A.

Experimental Example 2—Strength Test (Creep Test)

Figure 4:
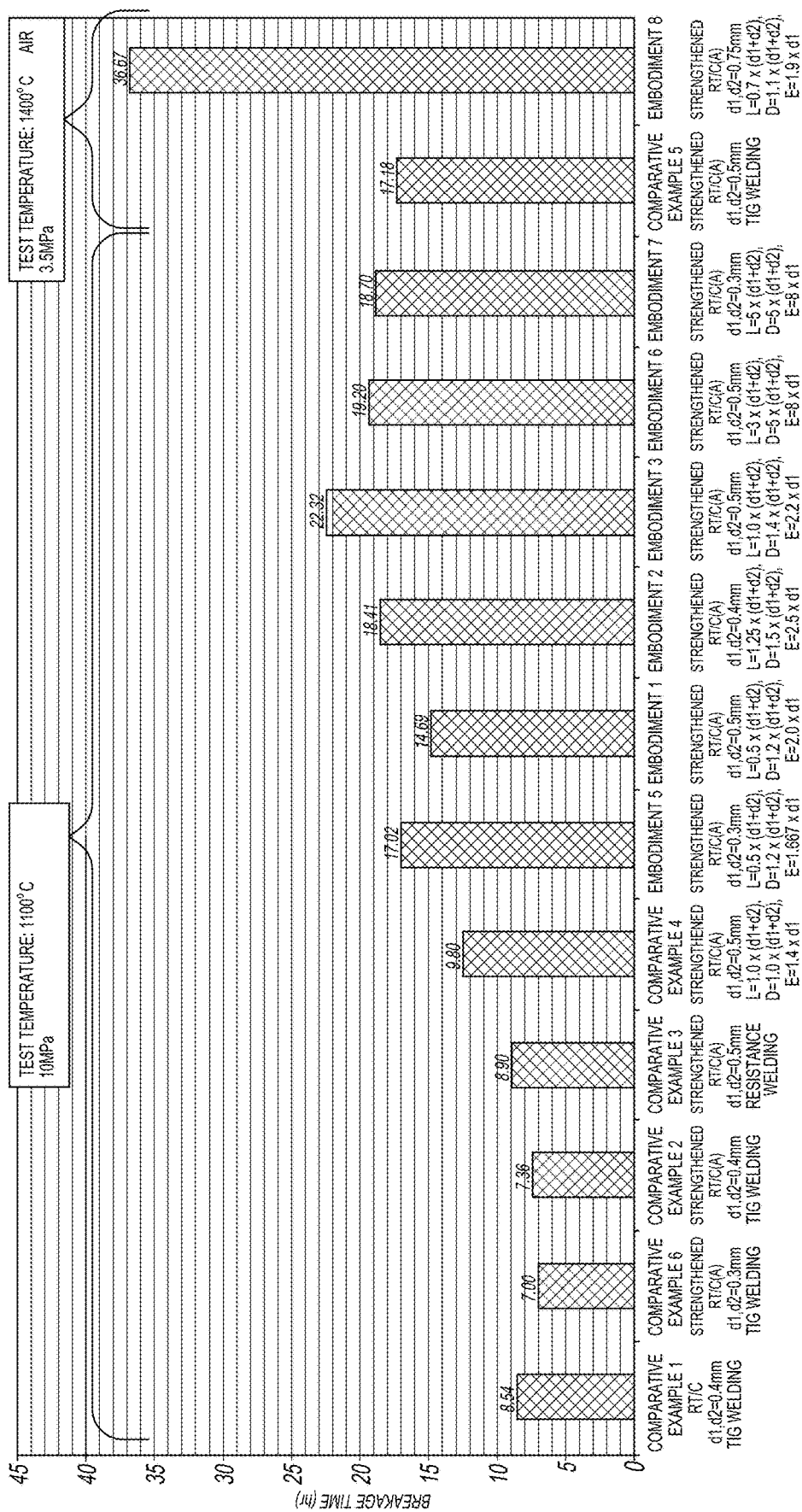
FIG. 4 is a result of a strength test (creep test).

Thermocouples (Embodiments 1 to 3, and Comparative Example 4) were manufactured as follows. Tips of wires were disposed in parallel in the opposite directions so as to be brought into contact with each other and clamped by a clamping member to form a temperature measuring junction portion, thus obtaining the thermocouple. At this time, a texture-control-strengthened Pt wire (diameter d1=0.5 mm in Embodiments 1 and 3 and Comparative Example 4, and diameter d1=0.4 mm in Embodiment 2) was used as one wire, and a Pt—Rh alloy wire (diameter d2=0.5 mm in Embodiments 1 and 3 and Comparative Example 4, and diameter d2=0.4 mm in Embodiment 2) was used as another wire, and a tubular member made of Pt was used as the clamping member. The two wires were arranged over the entire region of the clamping member in the longitudinal direction of the wire. The d1, d2, L, D and E are as illustrated in FIG. 4.

In the same manner as in Embodiment 1, a thermocouple (Embodiment 5) was manufactured. In addition, the thermocouples of Embodiments E and H used in the temperature responsiveness test were set as Embodiments 6 and 7, respectively, in the same manner as in Embodiment 1. The d1, d2, L, D and E are as illustrated in FIG. 4.

A thermocouple (Embodiment 4) was manufactured as follows. Tips of wires were disposed in parallel in the opposite directions so as to be brought into contact with each other and clamped by a clamping member to form a temperature measuring junction portion, thus obtaining the thermocouple. At this time, an oxide-dispersion-strengthened Pt wire (diameter d1=0.75 mm) was used as one wire, a Pt—Rh alloy wire (diameter d2=0.75 mm) was used as another wire, and a tubular member made of Pt was used as the clamping member. The two wires were arranged over the entire region of the clamping member in the longitudinal direction of the wire. The d1, d2, L, D and E are as illustrated in FIG. 4.

As a conventional bonding (Comparative Example 1), a thermocouple having a temperature measuring junction formed by TIG welding end portions of a Pt wire (diameter d1=0.4 mm) and a Pt—Rh alloy wire (diameter d2=0.4 mm) was manufactured. The temperature measuring junction had a size in which a length (corresponding to L) of the junction was 1.5 (d1+d2) in the longitudinal direction of the wire, a maximum width (corresponding to D) of the junction was 1.5 (d1+d2) in the parallel direction of the wire, and a maximum width (corresponding to E) of the junction was 3×d1 in a direction orthogonal to the parallel direction.

In Comparative Example 2, a thermocouple was manufactured in the same manner as in Comparative Example 1 except that a texture-control-strengthened Pt wire (diameter d1=0.4 mm) and a Pt—Rh alloy wire (diameter d2=0.4 mm) were used.

In Comparative Example 3, a texture-control-strengthened Pt wire (diameter d1=0.5 mm) and a Pt—Rh alloy wire (diameter d2=0.5 mm) were used, and a thermocouple having a temperature measuring junction formed by resistance welding was manufactured. Since only a part of a contact portion of two wires is melted in the temperature measuring junction of the resistance welding, the temperature measuring junction had a size in which a length (corresponding to L) of the junction was 1.5 (d1+d2) in the longitudinal direction of the wire, a maximum width (corresponding to D) of the junction was 0.75 (d1+d2) in the parallel direction of the wire, and a maximum width (corresponding to E) of the junction was 2×d1 in a direction orthogonal to the parallel direction.

In Comparative Example 5, a thermocouple was manufactured in the same manner as in Comparative Example 1 except that an oxide-dispersion-strengthened Pt wire (diameter d1=0.5 mm) and a Pt—Rh alloy wire (diameter d2=0.5 mm) were used.

In Comparative Example 6, a thermocouple was manufactured in the same manner as in Comparative Example 1 except that a texture-control-strengthened Pt wire (diameter d1=0.3 mm) and a Pt—Rh alloy wire (diameter d2=0.3 mm) were used.

The strength test (creep test) was performed on the thermocouples of Embodiments 1 to 3 and Comparative Examples 1 to 4 as follows. The thermocouple was placed so that the temperature measuring junction was disposed in the center of an electric furnace at 1100° C. in an ambient air, a load of 10 MPa was applied to the thermocouple, and the time (hereinafter, also referred to as a breakage time) elapsed until the thermocouple was broken was measured. This test was carried out on three samples for each embodiment and each comparative example, and average values of the breakage time are illustrated in FIG. 4. The case where the average value of the breakage time exceeds 10 hours (hr) was set as a practical level, and the case where the average value of the breakage time is 10 hours or less was set as an unpractical level.

For the thermocouples of Embodiments 5 to 7 and Comparative Examples 6, the strength test (creep test) was carried out by the same evaluation method and evaluation criteria as in Embodiment 1. The average values of the breakage time are illustrated in FIG. 4.

In addition, the strength test (creep test) was performed on the thermocouples of Embodiment 4 and Comparative Example 5 as follows. The thermocouple was placed so that the temperature measuring junction was disposed in the center of an electric furnace at 1400° C. in an ambient air, a load of 3.5 MPa was applied to the thermocouple, and the time (hereinafter, also referred to as a breakage time) elapsed until the thermocouple was broken was measured. This test was carried out on three samples for each embodiment and each comparative example, and average values of the breakage time are illustrated in FIG. 4. The case where the average value of the breakage time exceeds 20 hours (hr) was set as a practical level, and the case where the average value of the breakage time is 20 hours or less was set as an unpractical level.

As illustrated in FIG. 4, in Embodiments 1 to 3, since the equations (1) to (3) were satisfied, the breakage time was longer than that of the conventional bonding (Comparative Examples 1 to 3) and the strength was higher than that of the conventional bonding. In Comparative Example 4, since the equations (2) and (3) were not satisfied, the breakage time was short and the strength was not improved sufficiently. Further, from the test results of Embodiment 4 and Comparative Example 5, it was confirmed that it possible to maintain high strength as in Embodiment 4 even in an ultra-high temperature range such as 1400° C. by satisfying the equations (1) to (3).

As illustrated in FIG. 4, in Embodiments 5 to 7, since the equations (1) to (3) were satisfied, the breakage time was longer than that of the conventional bonding (Comparative Examples 1 to 3, and 6) and the strength was higher than that of the conventional bonding. Further, Embodiment 7 is the thermocouple of Embodiment H of the temperature responsiveness test. Embodiment H (Embodiment 7) was somewhat superior to the conventional bonding (Comparative Example E) in the temperature responsiveness test, but the breakage time of Embodiment 7 was remarkably longer than that of the conventional bonding (Comparative Examples 1 to 3, and 6) in the strength test. Embodiment 6 is the thermocouple of Embodiment E of the temperature responsiveness test. Embodiment E (Embodiment 6) was somewhat superior to the conventional bonding (Comparative Example A) in the temperature responsiveness test, but the breakage time of Embodiment 6 was remarkably longer than that of the conventional bonding (Comparative Examples 1 to 3, and 6) in the strength test. As described above, it was confirmed that it is possible to remarkably increase the strength of the temperature measuring junction portion while maintaining the temperature responsibility equal to or superior to that of the conventional bonding by satisfying the equations (1) to (3).

REFERENCE SIGNS LIST

1 THERMOCOUPLE
2, 3 WIRE
4 CLAMPING MEMBER
5 TEMPERATURE MEASURING JUNCTION PORTION
6 CONTACT PORTION

What is claimed is:

1. A thermocouple comprising two wires and a clamping member, wherein the clamping member clamps the two wires such that distal end portions of the two wires are in contact with each other in parallel to provide a temperature measuring junction portion, wherein the two wires have diameters d1 and d2, respectively, d1≥d2, a length of the temperature measuring junction portion in a longitudinal direction of the two wires is L, a maximum width of the temperature measuring junction portion in a parallel direction of the two wires is D, and a maximum width in a direction orthogonal to the parallel direction in a cross section of the temperature measuring junction portion is E, the following equations (1) to (3) are satisfied:

$0.5 \times (d1+d2) \leq L \leq 5 \times (d1+d2)$      Equation (1)

$1 \times (d1+d2) < D \leq 5 \times (d1+d2)$      Equation (2)

$1.4 \times d1 < E \leq 8 \times d1.$      Equation (3)

2. The thermocouple according to claim 1, wherein at least one location between at least one of the two wires and the clamping member is diffusion-bonded.

3. The thermocouple according to claim 1, wherein the distal end portions of the wires are arranged over an entire area of the clamping member.

4. The thermocouple according to claim 1, wherein the distal end portions of the wires are arranged in a partial area of the clamping member.

5. The thermocouple according to claim 1, wherein the distal end portions of the wires protrude from the clamping member.

6. The thermocouple according to claim 1, wherein at least one of the two wires has a texture such that a number of the crystal grains in a radial direction of the wires is 2 or more.

7. The thermocouple according to claim 6, wherein at least one location between at least one of the two wires and the clamping member is diffusion-bonded.

8. The thermocouple according to claim 1, wherein at least one of the two wires has a texture such that an aspect ratio of a length of crystal grains of a texture in the longitudinal direction of the wires and a length of the crystal grains of the texture in a radial direction of the wires is 5 or more.

9. The thermocouple according to claim 8, wherein at least one location between at least one of the two wires and the clamping member is diffusion-bonded.

10. The thermocouple according to claim 8, wherein at least one of the two wires has the texture such that the number of the crystal grains in the radial direction of the wires is 2 or more.

11. The thermocouple according to claim 10, wherein at least one location between at least one of the two wires and the clamping member is diffusion-bonded.

\* \* \* \* \*